(12) United States Patent
Singh

(10) Patent No.: US 11,521,761 B2
(45) Date of Patent: Dec. 6, 2022

(54) RADIATION SHIELDED ENCLOSURE FOR SPENT NUCLEAR FUEL CASK

(71) Applicant: HOLTEC INTERNATIONAL, Camden, NJ (US)

(72) Inventor: Krishna P. Singh, Jupiter, FL (US)

(73) Assignee: HOLTEC INTERNATIONAL

(*) Notice: Subject to any disclaimer, the term of this patent is extended or adjusted under 35 U.S.C. 154(b) by 240 days.

(21) Appl. No.: 17/000,493

(22) Filed: Aug. 24, 2020

(65) Prior Publication Data

US 2021/0057120 A1   Feb. 25, 2021

Related U.S. Application Data

(60) Provisional application No. 62/890,813, filed on Aug. 23, 2019.

(51) Int. Cl.
| | |
|---|---|
| *G21F 9/34* | (2006.01) |
| *G21F 5/00* | (2006.01) |
| *G21F 5/12* | (2006.01) |
| *G21F 5/10* | (2006.01) |
| *G21F 1/12* | (2006.01) |
| *G21F 5/008* | (2006.01) |

(52) U.S. Cl.
CPC ............... *G21F 9/34* (2013.01); *G21F 1/125* (2013.01); *G21F 5/008* (2013.01); *G21F 5/10* (2013.01); *G21F 5/12* (2013.01)

(58) Field of Classification Search
CPC . G21F 9/34; G21F 1/125; G21F 5/008; G21F 5/10; G21F 5/12
USPC ......... 250/505.1, 506.1, 507.1, 515.1, 516.1, 250/517.1, 518.1, 519.1
See application file for complete search history.

(56) References Cited

U.S. PATENT DOCUMENTS

| | | |
|---|---|---|
| 6,605,817 B1 | 8/2003 | Nihei et al. |
| 9,831,005 B2 | 11/2017 | Singh |

(Continued)

FOREIGN PATENT DOCUMENTS

WO   WO 2018/183406   10/2018

OTHER PUBLICATIONS

International Search Report issued in International Application No. PCT/US2020/047576 dated Nov. 19, 2020.
European Search Report 20858457.3 dated Sep. 1, 2022.

*Primary Examiner* — Nicole M Ippolito
(74) *Attorney, Agent, or Firm* — The Belles Group, P.C.

(57) ABSTRACT

A containment enclosure for shielding an outer cask containing an inner canister loaded with nuclear waste such as spent fuel rods. The enclosure includes a lower base portion at least partially embedded in a concrete pad and an upper radiation shielding portion defined by a shield jacket coupled to and supported by the lower base portion at a circumferential joint. Cavities of the base and shielding portions collectively define a contiguous containment space for the cask. A portion of the cask resides in each of the base and shielding portions which completely enclose and shield the cask to minimize radiation dosage of personnel in the environment surrounding the cask. The cask is cooled by a natural convectively-driven ambient cooling air ventilation system including air inlets at the circumferential joint of the enclosure. The concrete pad may be part of a spent nuclear fuel storage installation comprising plural cask containment enclosures.

30 Claims, 15 Drawing Sheets

(56) References Cited

U.S. PATENT DOCUMENTS

| | | |
|---|---|---|
| 2006/0215803 A1 | 9/2006 | Singh |
| 2011/0255647 A1 | 10/2011 | Singh |
| 2012/0083644 A1 | 4/2012 | Singh |
| 2014/0226777 A1 | 8/2014 | Singh |
| 2014/0321596 A1 | 10/2014 | Singh et al. |
| 2015/0357066 A1 | 12/2015 | Singh |
| 2018/0025799 A1* | 1/2018 | Kim .......................... G21F 1/06 |
| | | 250/515.1 |
| 2018/0130566 A1 | 5/2018 | Hida et al. |
| 2018/0190401 A1 | 7/2018 | Singh |
| 2018/0330836 A1 | 11/2018 | Arafat et al. |
| 2019/0119864 A1* | 4/2019 | Tuan ..................... E01C 11/265 |
| 2020/0027608 A1* | 1/2020 | Singh ........................ G21F 5/10 |

\* cited by examiner

RADIATION SHIELDED ENCLOSURE FOR SPENT NUCLEAR FUEL CASK

CROSS-REFERENCE TO RELATED APPLICATIONS

This application claims the benefit of U.S. Provisional Application No. 62/890,813 filed Aug. 23, 2019, which is incorporated herein by reference in its entirety.

BACKGROUND

The present invention relates generally to systems for storing used or spent nuclear fuel, and more particularly to an improved nuclear fuel cask which forms part of the storage system.

In the operation of nuclear reactors, the nuclear energy source is in the form of hollow zircaloy tubes filled with enriched uranium, collectively arranged in multiple assemblages referred to as fuel assemblies. When the energy in the fuel assembly has been depleted to a certain predetermined level, the used or "spent" nuclear fuel (SNF) assemblies are removed from the nuclear reactor. The standard structure used to package used or spent fuel assemblies discharged from light water reactors for off-site shipment or on-site dry storage is known as the fuel basket. The fuel basket is essentially an assemblage of prismatic storage cells each of which is sized to store one fuel assembly that comprises a plurality of individual spent nuclear fuel rods. The fuel basket is arranged inside a cylindrical metallic storage canister (typically stainless steel), which is often referred to as a multi-purpose canister (MPC), which forms the primary containment.

The canister loaded with SNF is then placed into an outer ventilated overpack or cask, which forms the secondary containment, for safe transport and storage of the multiple spent fuel assemblies. Casks are used to transfer the SNF the cask from the spent fuel pool ("transfer cask") in the nuclear reactor containment structure to a more remote staging area for interim term storage such as in the dry cask storage system of an on-site or off-site independent spent fuel storage installation (ISFSI) until a final repository for spent nuclear fuel is available from the federal government.

A significant number of dry storage casks containing SNF congregated at an ISFSI pad, however, often accrue radiation dose at the nuclear plant's site boundary that exceeds the allowable limit for the local jurisdiction and/or the federal government. The dose emanating from such casks must be attenuated to enable them to be used in the intermediate term storage role at an ISFSI.

Improvements in radiation level reduction for dry storage casks which overcomes the foregoing deficiencies are desired.

BRIEF SUMMARY

To overcome the foregoing limitations in the art for intermediate storage of spent nuclear fuel (SNF) or other high level radioactive nuclear wastes generated by the nuclear reactor at a nuclear facility, the present disclosure provides a tertiary radiation containment approach to supplement the primary and secondary containment measures of the canister and dry storage cask which may still emit radiation exceeding acceptable dosage limits.

A nuclear waste storage system according to the present disclosure generally comprises an outer radiation-shielded cask containment enclosure configured for housing a nuclear waste dry storage cask inside (which in turn contains the radioactive SNF canister housing the waste). The shielded enclosure may be incorporated directly into the previously mentioned independent spent fuel storage installation (ISFSI) or other intermediate nuclear waste storage facility. In some installations, each storage cask in the array of casks of the ISFSI may include a tertiary radiation shielded outer enclosure.

In certain embodiments, the outer shielded cask containment enclosure may be embedded at least partially in the concrete pad of the independent spent fuel storage installation (ISFSI) to take advantage of the gamma and neutron radiation blocking/attenuation properties of the thick concrete mass. The shielded enclosure may comprise two parts including a lower base portion embedded at least partially in the concrete pad, and a separate discrete upper radiation shielding portion coupled thereto at a circumferential joint. In some embodiments, the portions may be approximately equal height representing half-sections; however, either portion may be taller than the other in some implementations. The base and radiation shielding portions are coupled together in the field at the ISFSI to complete the cask containment enclosure which completely surrounds the nuclear waste cask. The upper shielding portion is coupled to the lower base portion after the cask is placed inside the base portion. In some embodiments, an annular gasket forms a gas-tight seal between the lower and upper portions of the enclosure.

The upper shielding portion may be configured as a radiation-blocking shield jacket which is positioned over the upper portion of the cask which protrudes upwards beyond the lower base portion and is otherwise exposed above the top surface of the concrete pad (i.e. grade). The jacket is fabricated of radiation blocking/shielding material for reducing radiation emissions from the cask. In preferred embodiment, the shielding material comprises a boron-containing material and metal which effectively blocks/attenuates both gamma and neutron radiation.

In some embodiments, the cask containment enclosure may be ventilated to allow ambient cooling air to flow inwards between the containment enclosure and cask via natural convective thermo-siphon effect induced air flow as the air within the enclosure is heated by the heat radiating outwards from the cask. The cooling air ventilation system may comprise a plurality of upper air inlets formed which may be formed in the middle waist area of the cask containment enclosure at the horizontal circumferential joint between the lower base portion and upper shielding portion. The natural flow air ventilation system thus is unaided by a powered blower or fan which therefore does not rely on an available source of power. This allows the cask containment enclosure to be located at remote sites and is not susceptible to power outages which could in result in overheating the enclosure and compromising the structural integrity of the cask-canister containment vessels.

The concrete pad of the interim storage facility may be expansive in extend being dimensioned in length and width to hold a plurality of shielded enclosures in an array. Examples of such facilities are the HI-STORE consolidated interim storage facility from Holtec International of Camden, N.J.

Advantageously, the cask containment enclosure disclosed herein reduces radiation emitted by the cask directly at its source, in contrast to other possible approaches focused on the site boundary of the ISFSI such as constructing earthen berms or thick concrete walls around the entire perimeter of the storage site. Such peripheral amelioration of the radiation dosage problems is not only expensive due to the required length of the perimetrically-extending berms or walls, but notably these measures do not reduce the ambient radiation levels inside the ISFSI itself where crews work. The radiation field within the ISFSI is beneficially ameliorated by the present cask containment enclosure resulting in reduced radiation dose to the plant staff in the ISFSI. In addition, there is no limit to the amount of shielding and/or type than can be used and combined in the radiation-blocking shield jacket; therefore, substantial dose reductions can be realized which is not possible with a berm construction.

According to one aspect, a containment enclosure for shielding a nuclear waste cask comprises: a lower base portion at least partially embedded in a concrete pad, the base portion comprising a baseplate supporting a plurality of coaxially aligned shells defining a lower cavity; an upper radiation shielding portion coupled to and supported by the lower base portion, the shielding portion defining an upper cavity; the shielding portion comprising a radiation shielding material configured to block gamma and neutron radiation; the lower and upper cavities collectively defining a contiguous containment space configured for holding the cask; wherein the base and shielding portions enclose the cask.

According to another aspect, a nuclear waste storage system comprises: a concrete pad; and a plurality of cask containment enclosures arranged on the concrete pad, each containment enclosure housing a storage cask containing a canister holding radioactive nuclear waste. Each containment enclosure comprises: a cylindrical lower base portion at least partially embedded in the concrete pad, the lower base portion comprising a baseplate supporting a plurality of coaxially aligned shells defining a lower cavity; a separate upper shield jacket coupled to and supported by the lower base portion, the shield jacket having a wall construction comprising boron-containing radiation shielding materials, the upper shield jacket defining an upper cavity; a plurality of ambient cooling air inlets formed in the shield jacket, the air inlets circumferentially spaced apart at a circumferential joint between the base portion and the shield jacket; an annular air inlet plenum formed at a bottom of the shield jacket by an inwardly recessed stepped portion of the shield jacket, air inlet plenum located at the circumferential joint and in direct fluid communication with the air inlets and a downcomer formed in the lower base portion; a plurality of air exchange passageways circumferentially spaced apart at a bottom of the base portion, the passageways in fluid communication with the downcomer and a riser which extends vertically between the cask and innermost surfaces of the lower base portion and shield jacket; and a top discharge opening formed in the shield jacket in fluid communication with the riser and ambient air; wherein the storage cask containing nuclear waste is positioned partially in both the upper and lower cavities of the lower base portion and shield jacket.

According to another aspect, a method for providing radiation shielding for a cask containing a nuclear waste canister comprises: at least partially embedding an upwardly open base portion in a concrete pad; lowering the cask into the upwardly open lower cavity of the base portion; positioning a shield jacket over the cask; and abuttingly engaging the shield jacket with the base portion forming a circumferential joint therebetween; wherein the cask is fully enclosed by the shield jacket and base portion.

Further areas of applicability of the present invention will become apparent from the detailed description provided hereinafter. It should be understood that the detailed description and specific examples, while indicating the preferred embodiment of the invention, are intended for purposes of illustration only and are not intended to limit the scope of the invention.

BRIEF DESCRIPTION OF THE DRAWINGS

The present invention will become more fully understood from the detailed description and the accompanying drawings, wherein like elements are labeled similarly and in which.

Figure 1:
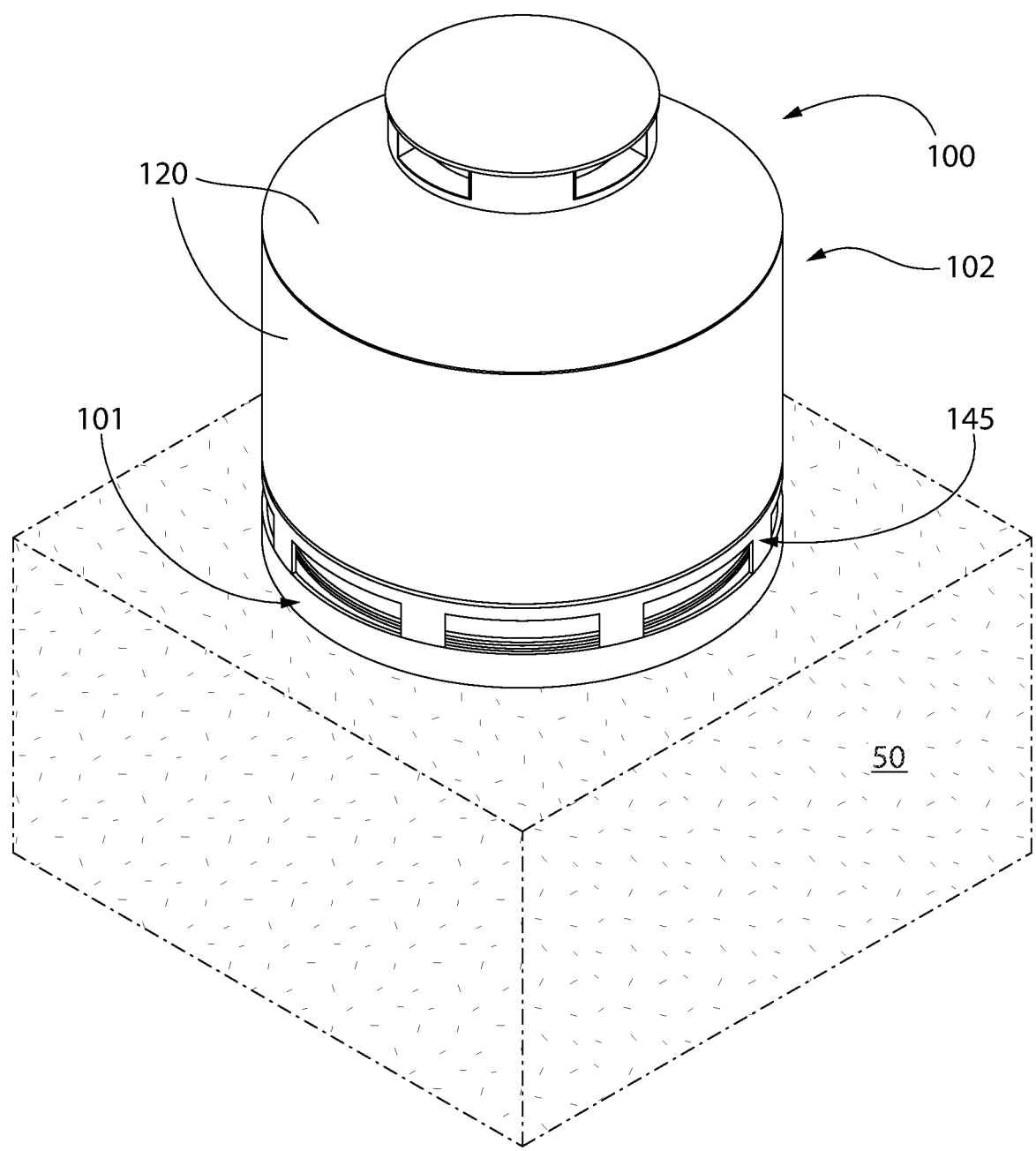
FIG. 1 is a top perspective view of a containment enclosure for radioactively shielding a cask storing a canister therein containing radiation nuclear waste, with the enclosure shown partially embedded in a section of a concrete pad.
Figure 2:
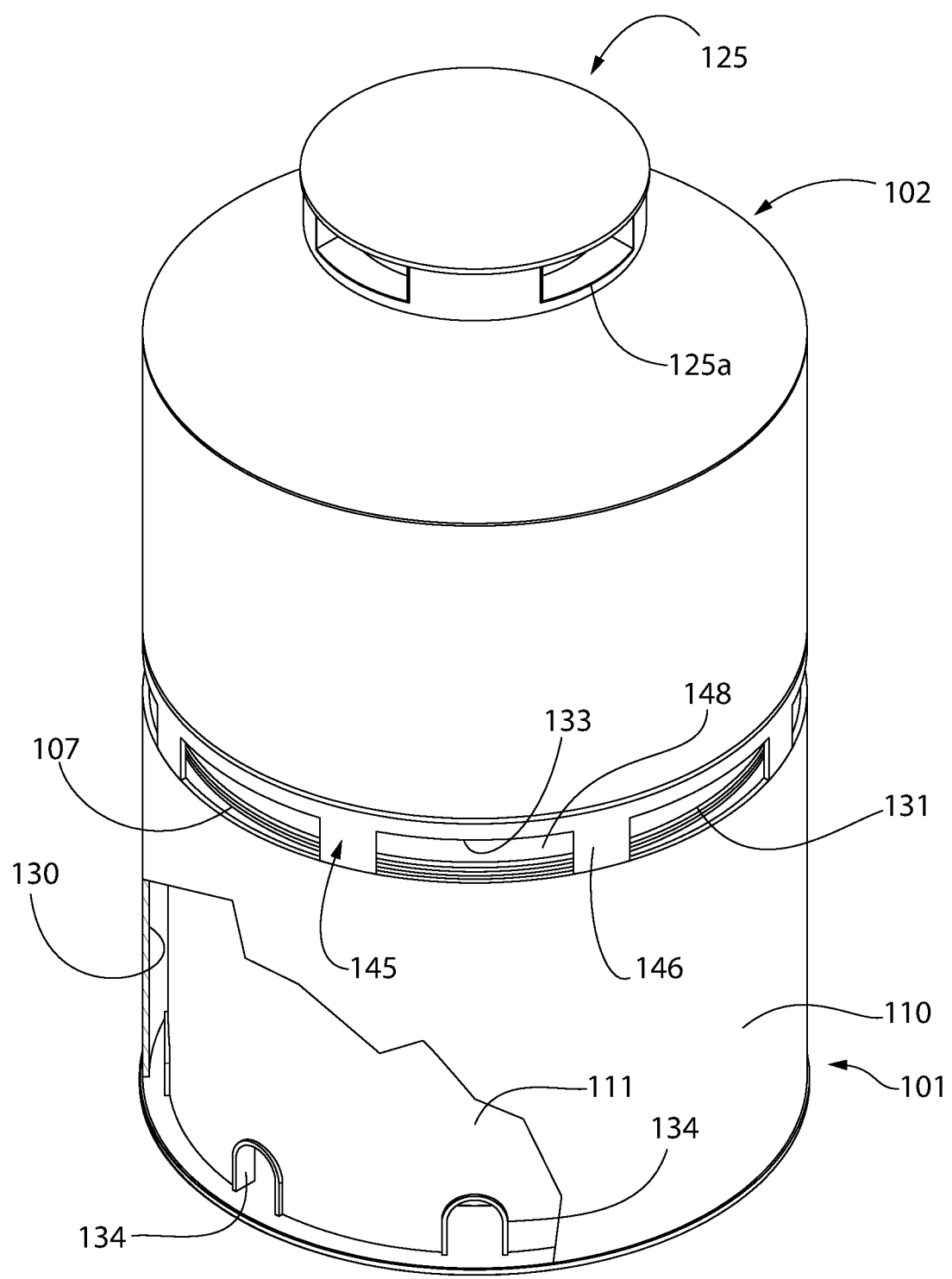
FIG. 2 is a top perspective view thereof of the containment enclosure alone.
Figure 3:
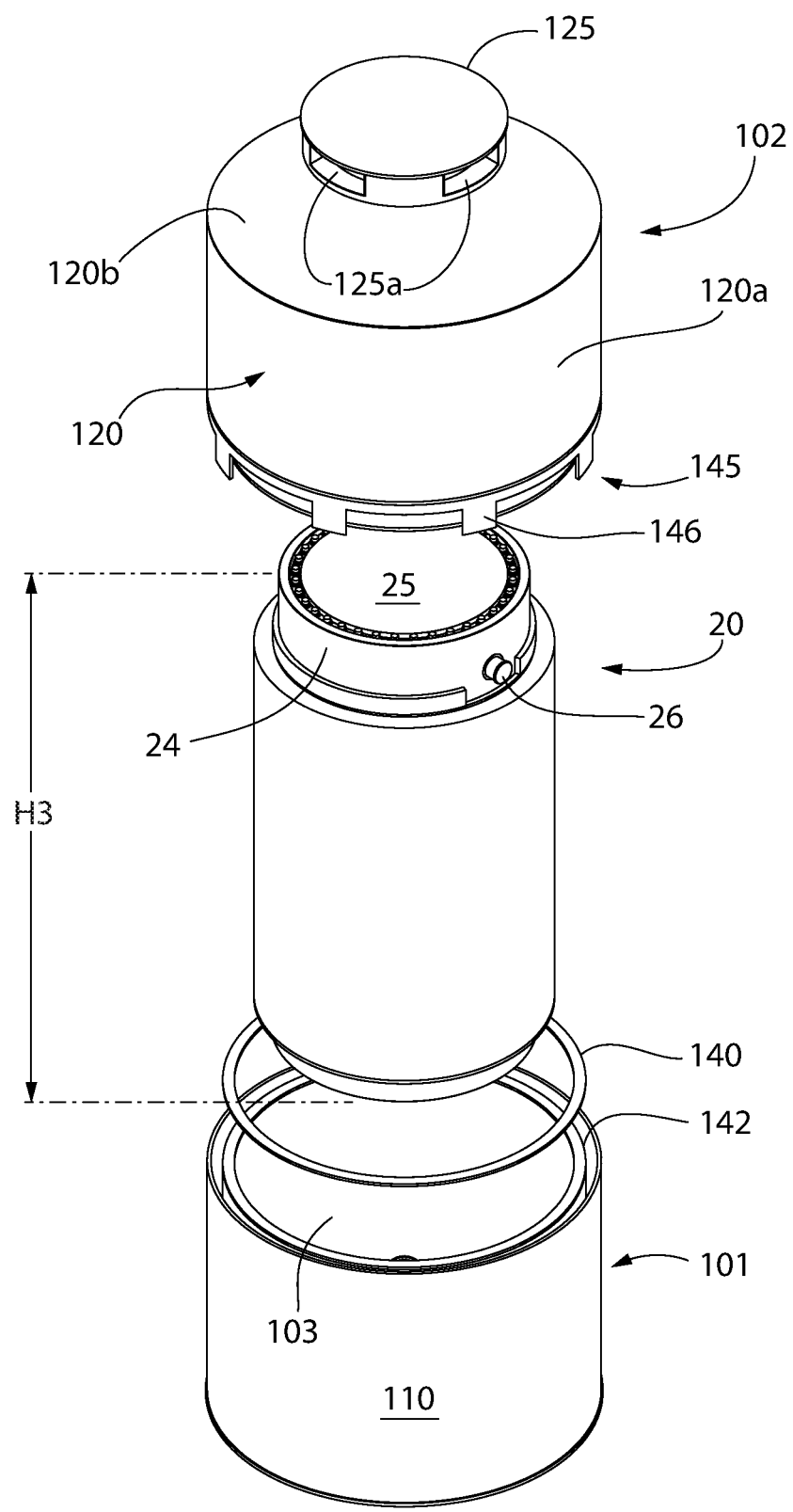
FIG. 3 is a top exploded perspective view thereof.
Figure 4:
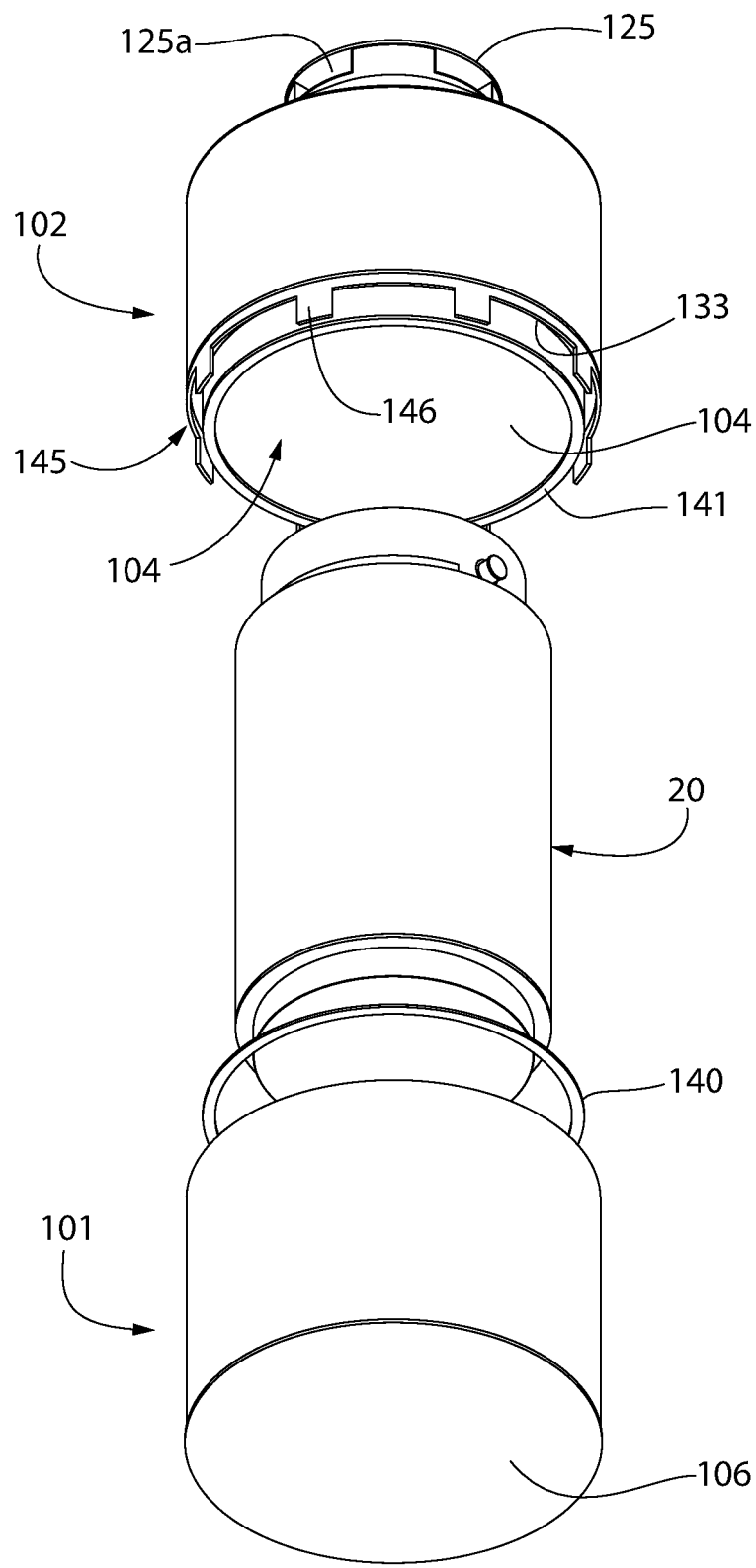
FIG. 4 is a bottom exploded perspective view thereof.
Figure 5:
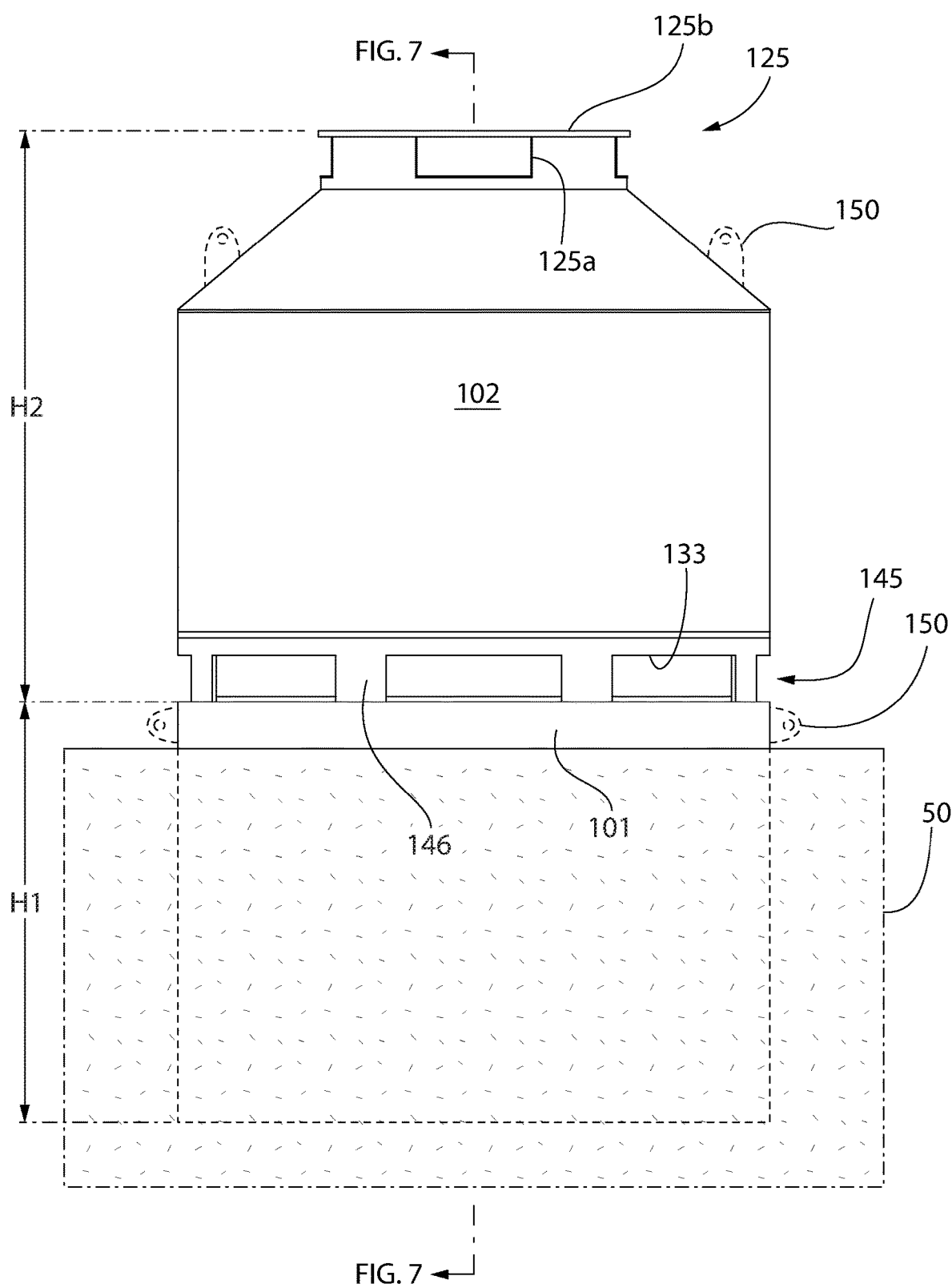
FIG. 5 is a side view thereof.
Figure 6:
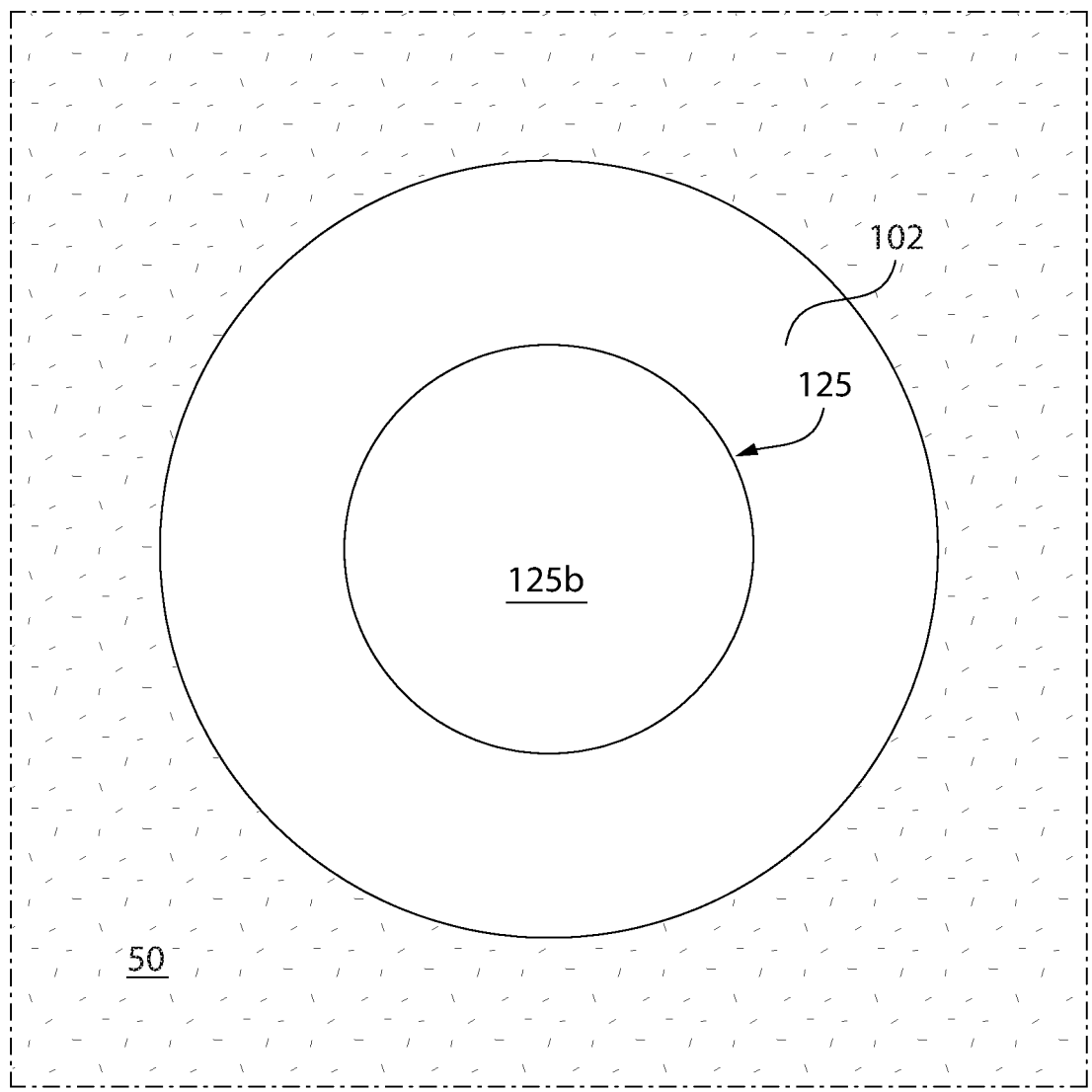
FIG. 6 is a top view of the containment enclosure and concrete pad of FIG. 1.
Figure 7:
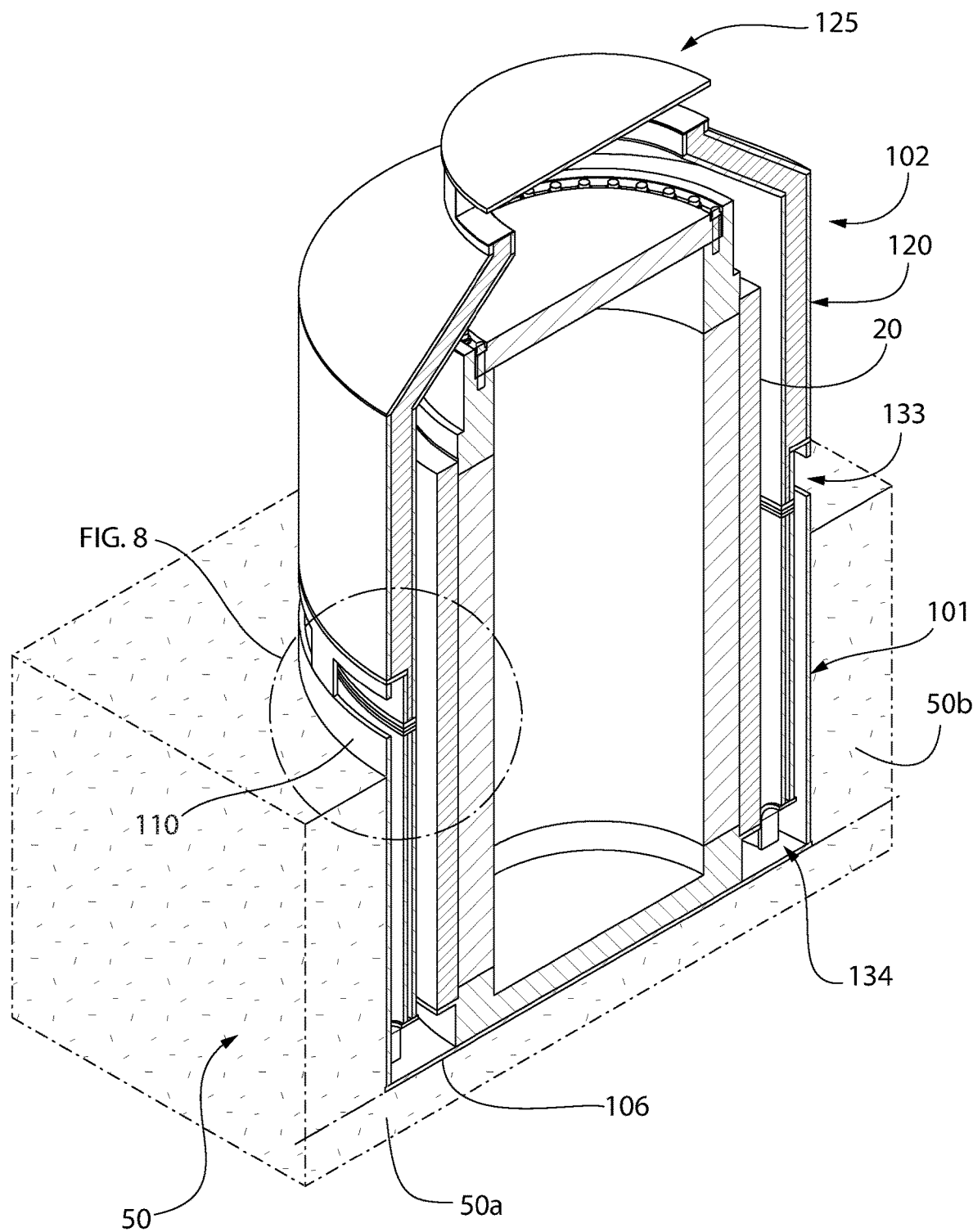
FIG. 7 is cross-sectional perspective view thereof.
Figure 8:
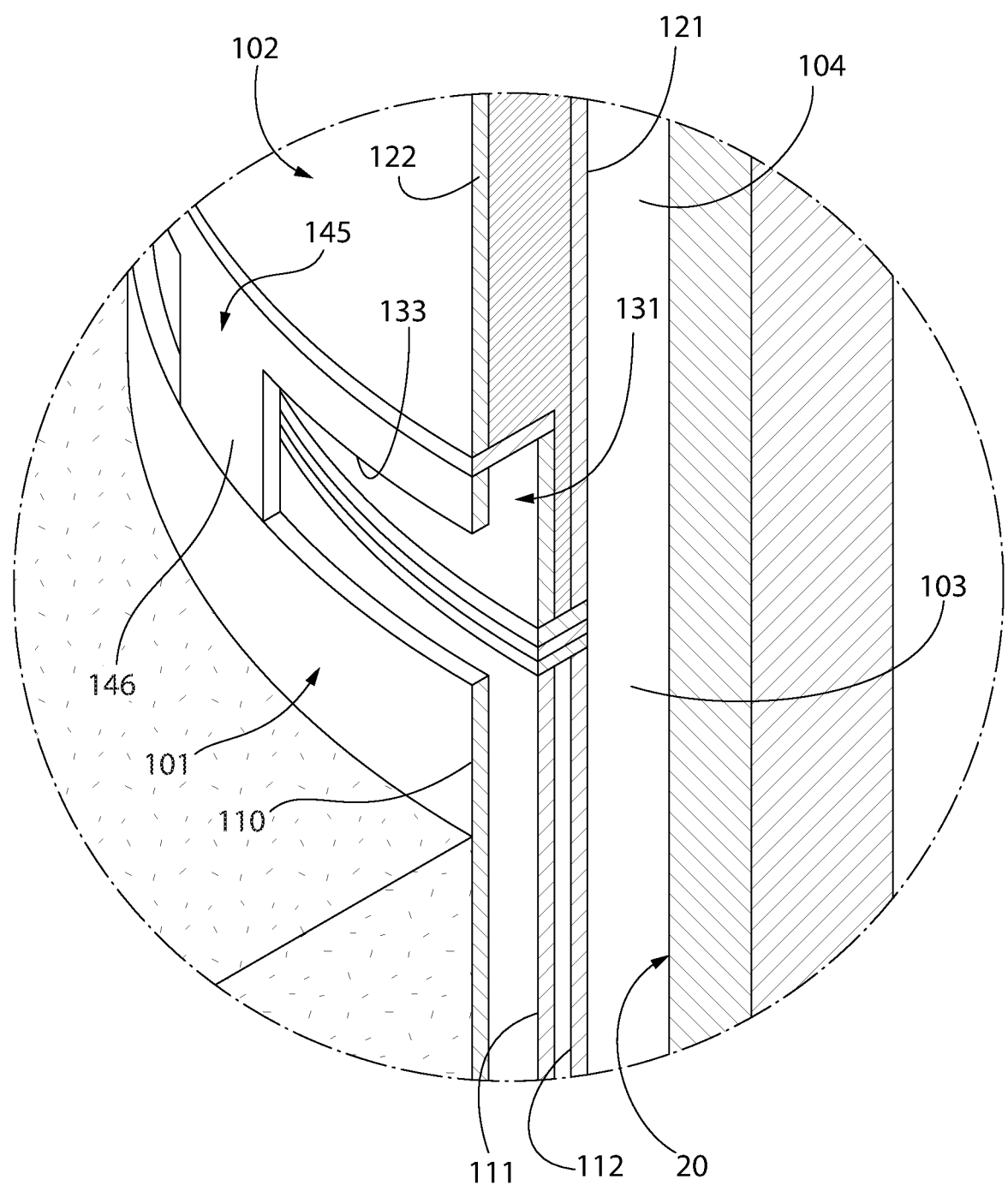
FIG. 8 is an enlarged detail from FIG. 7.

All drawings are schematic and not necessarily to scale. Features shown numbered in certain figures which may appear un-numbered in other figures are the same features unless noted otherwise herein.

DETAILED DESCRIPTION

The features and benefits of the invention are illustrated and described herein by reference to exemplary embodiments. This description of exemplary embodiments is intended to be read in connection with the accompanying drawings, which are to be considered part of the entire written description. Accordingly, the disclosure expressly should not be limited to such exemplary embodiments illustrating some possible non-limiting combination of features that may exist alone or in other combinations of features.

In the description of embodiments disclosed herein, any reference to direction or orientation is merely intended for convenience of description and is not intended in any way to limit the scope of the present invention. Relative terms such as "lower," "upper," "horizontal," "vertical,", "above,"

"below," "up," "down," "top" and "bottom" as well as derivatives thereof (e.g., "horizontally," "downwardly," "upwardly," etc.) should be construed to refer to the orientation as then described or as shown in the drawing under discussion. These relative terms are for convenience of description only and do not require that the apparatus be constructed or operated in a particular orientation. Terms such as "attached," "affixed," "connected," "coupled," "interconnected," and similar refer to a relationship wherein structures are secured or attached to one another either directly or indirectly through intervening structures, as well as both movable or rigid attachments or relationships, unless expressly described otherwise.

As used throughout, any ranges disclosed herein are used as shorthand for describing each and every value that is within the range. Any value within the range can be selected as the terminus of the range. In addition, all references cited herein are hereby incorporated by reference in their entireties. In the event of a conflict in a definition in the present disclosure and that of a cited reference, the present disclosure controls.

As used herein, the terms "seal weld or welding" shall be construed according to its conventional meaning in the art to be a continuous weld which forms a gas-tight joint between the parts joined by the weld.

FIGS. 1-14 depict a nuclear waste storage system comprising a cask containment enclosure 100 for housing and shielding a nuclear waste cask 20 to ameliorate gamma and neutron radiation emitted by the spent nuclear fuel (SNF) or other high lever radioactive waste held in the SNF canister contained inside the cask. Cask 20 may be any commercially-available storage and/or transport cask, such as a HI-STORM cask available from Holtec International of Camden, N.J. or other.

Cask 20 has a vertically elongated metallic cylindrical body including an open top 21 end, a circular bottom closure plate 22 defining a bottom end 23, a cylindrical sidewall 24 extending between the ends, and an internal cavity 28. The cylindrical metallic SNF canister 30 (represented schematically by dashed lines and well known in the art) containing radioactive SNF or other nuclear waste W is insertable into cavity 28 through top end 21, which is then closed by a bolt-on lid 25 to seal the cask 20. Cavity 28 extends for a full height of the cask. The cavity 28 is configured (e.g. dimensions and transverse cross-sectional area) to conventionally holds only a single SNF canister 30.

Figure 9:
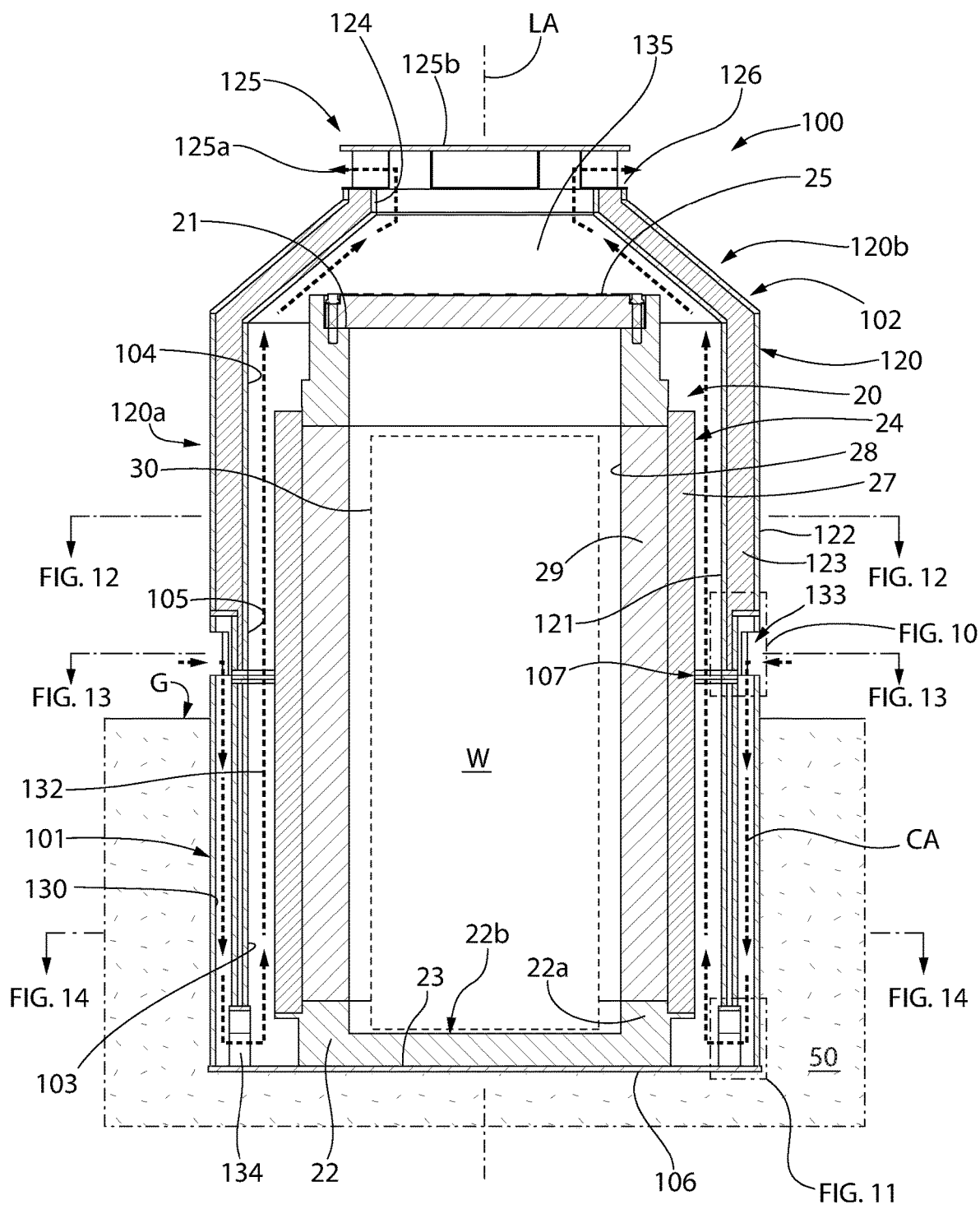
FIG. 9 is a side cross-sectional of the containment enclosure and concrete pad of FIG. 1.

Cask 20 may be comprised of a single long cylindrical shell 24, or alternatively may be formed by a plurality of axially aligned and vertically stacked cylinder segments seal welded together at the joints therebetween as best shown in FIG. 9 to collectively form the cask body. A pair of lifting lugs or protrusions 26 (see, e.g. FIGS. 3-4) are standardly provided for lifting and transporting the cask 20 via a motorized cask crawler typically driven by tank-like tracks for hauling the extremely heavy casks (e.g. 30 ton or more). Such robust cask crawlers are well known in the art without need for further elaboration and conventionally used for transporting and raising/lowering casks at a nuclear reactor facility (e.g. power generation plant or other) or interim nuclear waste storage facility. Cask crawler transporters are commercially-available from companies such as J&R Engineering Co. of Mukwonago, Wis. (e.g. LIFT-N-LOCK®) and others.

Bottom closure plate 22 of cask 20 may be considered cup-shaped in one embodiment having a cylindrical vertical stub wall 22a which rises up a short distance from the horizontal flat canister support surface 22b of the closure plate on which the SNF canister 30 is positioned when loaded into the cask. In other possible embodiments, however, the bottom closure plate 22 may be a flat plate and the lower end of cylindrical shell 24 may be welded directly to the peripheral edge of the plate.

The sidewall 24 of cask 20 may have a composite construction including at least one cylindrical metallic shell 29 and radiation shielding material 27. In some embodiments, the shielding material 24 may comprise concrete, lead, boron-containing materials, or a combination of these or other materials effective to block and/or attenuate gamma and neutron radiation emitted by the nuclear waste W in canister 30 enclosed by the cask 20. In certain embodiments, the radiation shielding material may be sandwiched between a pair of shells 29 depending on the nature and hardness of the material (only one shell shown in the figures for clarity).

The cask containment enclosure 100 of the nuclear waste storage system will now be described with continuing reference general reference to FIGS. 1-14.

Figure 15:
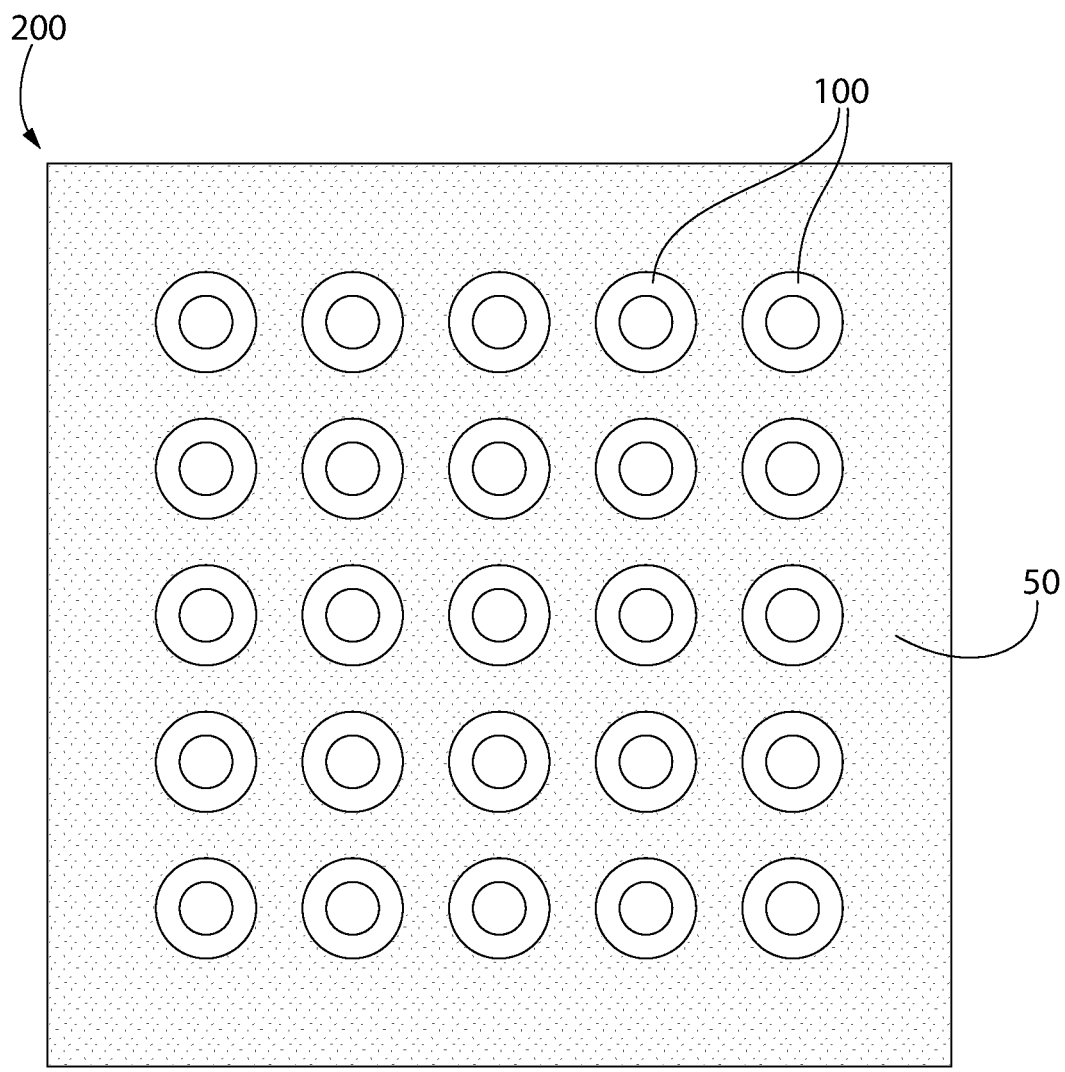
FIG. 15 is a top perspective view of an independent spent fuel storage installation (ISFSI) comprising an array of cask containment enclosures according to the present disclosure.

Cask containment enclosure 100 is a two-part vessel generally including lower base portion 101 and a separate discrete upper radiation shielding portion 102 coupled thereto at a circumferential joint 107 at the ISFSI 200 or other interim storage facility (see, e.g. FIG. 15). Upper radiation shielding portion 102 may alternatively be referred to herein as simply "upper shielding portion" for brevity. Cask containment enclosure 100 defines a vertical longitudinal axis LA aligned with the geometric center of the enclosure (shown in FIG. 9).

In some embodiments, the lower base and upper shielding portions 101, 102 may be approximately equal in height H1, H2 (respectively) representing half-sections; however, either portion may be shorter or taller than the other in some implementations. Lower base portion 101 and upper shielding portion 102 each have a respective height H1, H2 which is less than the height H3 of cask 20. Accordingly, the lower and upper portions are therefore coupled together to completely surround and enclose the full height of the cask.

Lower base portion 102 may be embedded at least partially in a concrete pad 50 of ISFSI 200 as shown. A majority of the height H1 of lower base portion 101, and preferably substantially the entire lower base portion except for the uppermost top portion which is coupled to the upper shielding portion 102 may be embedded (see, e.g. FIG. 9). This provides that about at least half the height H3 of the cask 20 is below grade G to help protect the cask and nuclear waste W therein in the event of a projectile impact. In addition, the embedment results in a lower overall exposed profile of the cask containment enclosure 100, which is less detectable and susceptible to both attack and severe weather incidents. In some embodiments, the lower base portion 101 may have a height H1 substantially greater than the height H2 of the upper shielding portion 102 such that a majority of the height of the cask 20 sits and is protected below grade G. This concomitantly results in the shorter upper shielding portion 102 having a lower exposed profile than illustrated, and the lower base portion 101 embedded further downward in concrete pad 50 than illustrated. The present cask containment enclosure 100 advantageously allows either portion to be customized in height as desired.

It bears noting that figures preceding FIG. 15, which shows an example of a complete ISFSI 200, show only a cutout portion of the concrete pad 50 immediately surrounding each cask containment enclosure 100 for compact illustrative purposes.

With continuing reference to FIGS. 1-14, the lower base portion and upper shielding portion 101, 102 each define a partial-height cavity of certain vertical depth relative to the height of the cask 20. Lower base portion 101 defines a lower cavity 103 of the cask containment enclosure 100. Upper shielding portion 102 defines an upper cavity 103 which communicates directly with the lower cavity. When the separable upper shielding portion is coupled to the lower base portion, cavities 103 and 104 combine to collectively define a contiguous common containment space 105 configured for holding and enclosing the entirety of the cask 20. The depth of the cavities 103, 104 may be adjusted as desired to suit architectural or other design considerations.

Referring particularly to FIGS. 7-11 and 14, lower base portion 101 in some embodiments may comprise a horizontal baseplate 106 supporting a plurality of coaxially aligned and vertically oriented cylindrical shells which define the lower cavity 103. The shells of the base portion 101 comprise an outer shell 110, and a pair of closely spaced innermost "conjugate" shells 111, 112 which structurally act as a double-walled stiffened single shell to better support and transfer the weight of the upper shielding portion 102 to the concrete pad 50. Shell 112 forms the inner boundary of base portion 102 surrounding cask 20 and defines the lower cavity 103.

Figure 14:
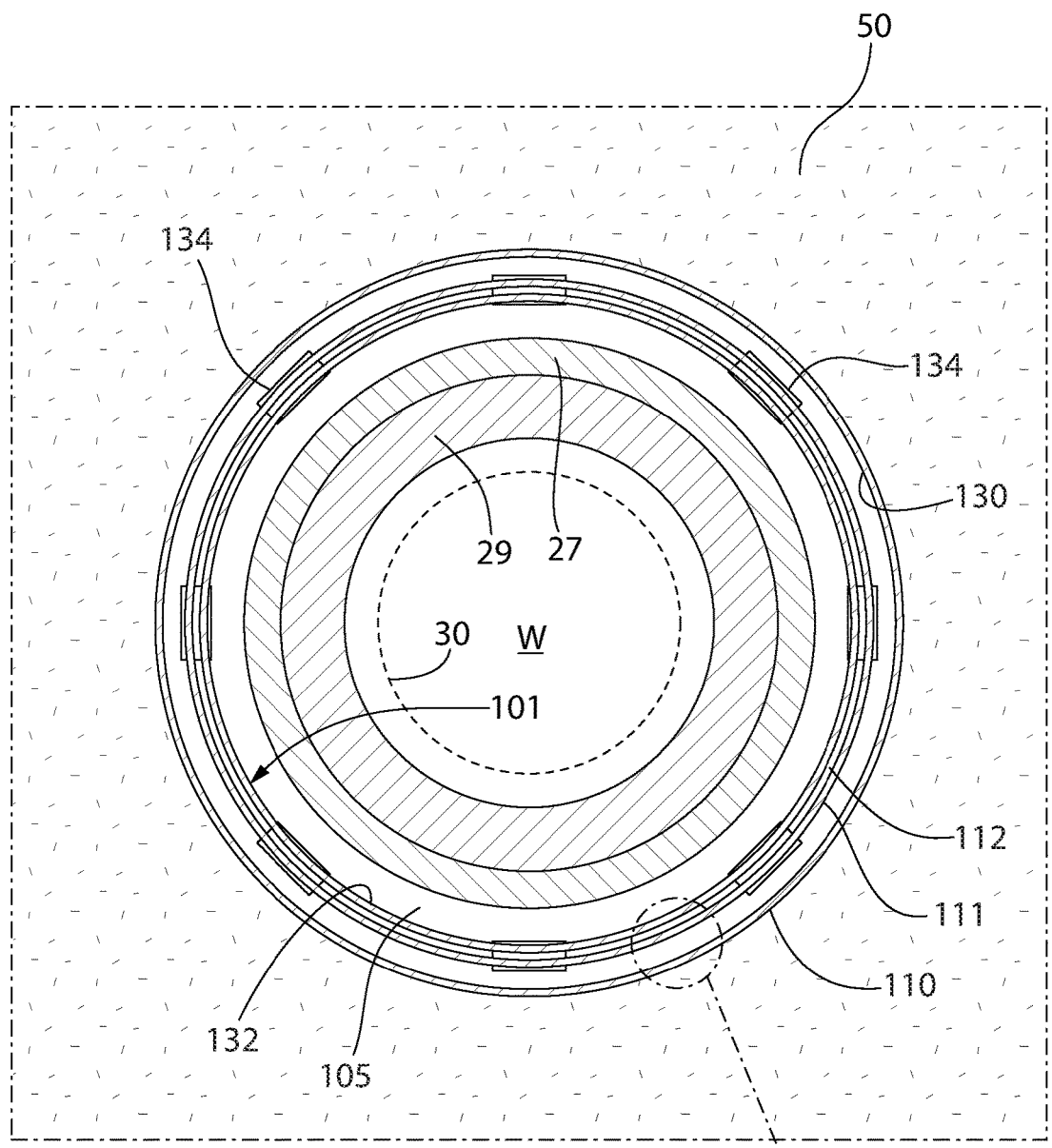
FIG. 14 is a third transverse cross-sectional view taken from FIG. 9 through a lower base portion of the containment enclosure.
Figure 14:
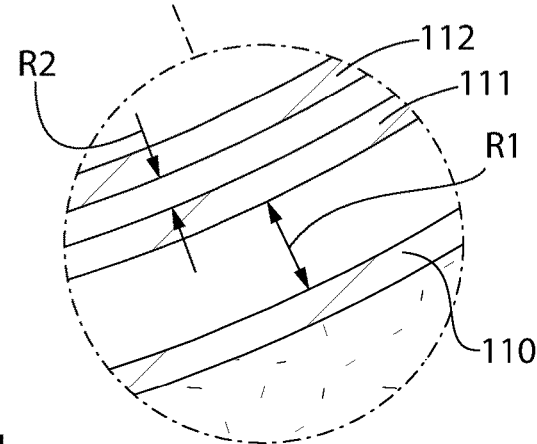

The paired conjugate shells are spaced radially inwards from outer shell 110 by a radial gap R1 defining a corresponding distance substantially greater than a radial gap R2 formed between the conjugate shells (see, e.g. FIG. 14). In some embodiments, gap R2 may be about 1 inch or less. Gap R2 in certain embodiments may be less than ½ inch such as for example without limitation about ⅛ inch in one non-limiting construction. Gap R2 may be evacuated for increasing thermal resistance to heat transfer across the shells. This prevents radially transmitted heat from cask 20 from preheating ambient cooling air descending in the cooling air downcomer 130 (FIG. 9) until the air can be evenly distributed around the exterior of the cask, as further described herein.

Bottom ends of shells 110-112 are hermetically seal welded to baseplate 106. The top ends of the conjugate shells 111, 112 are closed by an annular seal plate 142 welded thereto which completely encloses the radial gap R2. Radial gap R1 between the outer shell 110 and conjugate shells remains open at the top to define a portion of the cooling ventilation air inlet to annular downcomer 130. Gap R1 structurally defines the cooling ventilation air downcomer 130 in lower base portion 101.

The outer shell 110 and paired conjugate shells 111, 112 may be formed of steel, and preferably of corrosion resistant stainless steel in one embodiment. Other suitably strong structural metals however may be used.

Upper shielding portion 102 may be in the form of a double-walled radiation-blocking shield jacket 120 comprising radiation shielding material configured and selected to effectively block/attenuate gamma and neutron radiation. Because shield jacket 120 is located entirely above grade G of the concrete pad 50, it preferably provides the supplemental radiation shielding needed to compensate for radiation emission not blocked by the shielding of cask 20 alone which may exceed the allowable local and national dosage limits. The shield jacket 120 preferably extends for substantially the full height of the body of the upper shielding portion 102 (see, e.g. FIG. 9). The shield jacket has a composite wall construction comprising an outer wall 121, an inner wall 122, and an intermediate layer 123 sandwiched therebetween which is formed a radiation shielding material. Intermediate layer 123 is preferably thicker than the inner and outer walls in some embodiments as shown.

Shield jacket 120 of the upper shielding portion 102, formed by walls 121, 122 and intermediate layer 123, may have a compound shape including a lower cylindrical section 120a and upper frustoconical section 120b in some non-limiting embodiments. Frustoconical section 120b acts as a venturi which concentrates the internal rising and heated ventilation air flow and increases its velocity leaving top discharge opening 124, thereby advantageously increasing the naturally-driven thermos-siphon effect and amount of ambient cooling air drawn into the cask containment enclosure 100 to optimize the dissipation of heat generated by the cask 20. The sections 120a, 120b may be fabricated separately and seal welded together in the manufacturer's fabrication shop to form an integrated and self-supporting shield jacket structure which can be lifted and transported as a single unit. The top portion of upper cavity 104 terminates in a top vent or discharge opening 124 defined at the top end 126 of jacket 120. Top opening is protected by a cap 125 which still allows the heated cooling air to exit the upper shielding portion 102, but prevents the ingress of debris and rain into jacket. Cap 125 defines a plurality of laterally open air discharge outlets 125a through which the heated cooling air ascending in the cask containment enclosure 100 is discharged to atmosphere.

The walls 121, 122 of radiation-blocking shield jacket 120 may be formed of steel, and preferably of corrosion resistant stainless steel in one embodiment. Other suitably strong structural metals however may be used. Steel is effective at gamma ray blocking.

The intermediate layer 123 of jacket 120 may comprise boron-containing material which is effective to deflect and attenuate the neutron radiation. In some embodiments, the intermediate layer 123 may be formed of Holtite™ (a proprietary product of Holtec International of Camden, N.J.), which generally comprises hydrogen rich polymer impregnated with boron carbide particles. Other boron containing materials however may be used and the invention is not limited to use of the foregoing proprietary product. The metallic walls 121, 122 protect the intermediate layer 123 which may be softer and less impact resistant. The intermediate layer 123 thus protects the against direct neutron streaming, and in some embodiments may have a greater thickness than the inner or outer walls 121, 122. Other gamma or neutron blocking/attenuation materials may be included and used in the construction of the radiation-blocking shield jacket 120, such as for example without limitation lead or copper as some non-limiting examples.

Figure 10:
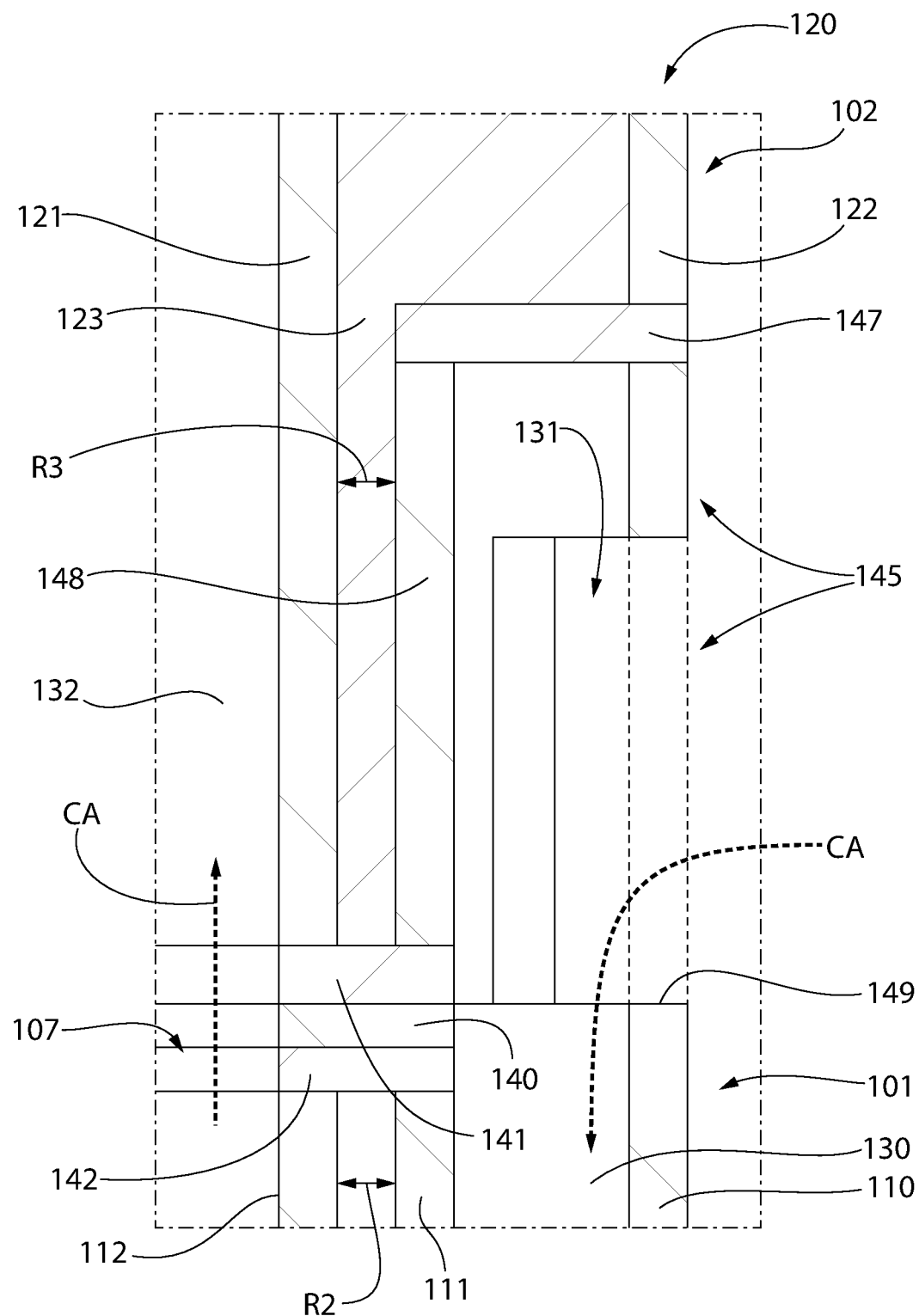
FIG. 10 is a first enlarged detail from FIG. 9 showing an ambient cooling air inlet of a natural convectively-driven air ventilation system of the enclosure.
Figure 11:
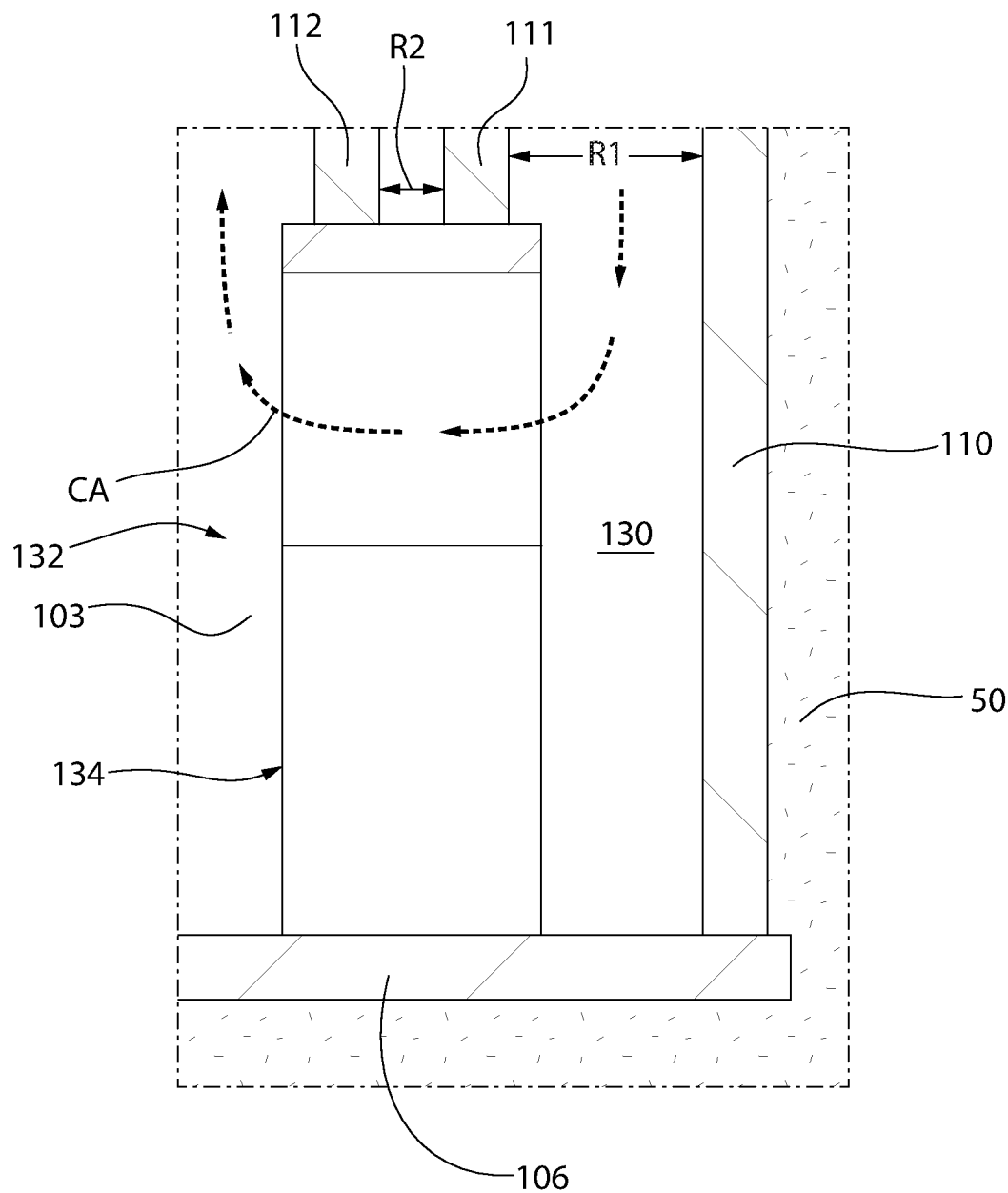
FIG. 11 is a second enlarged detail from FIG. 9 showing air exchange passageway.
Figure 12:
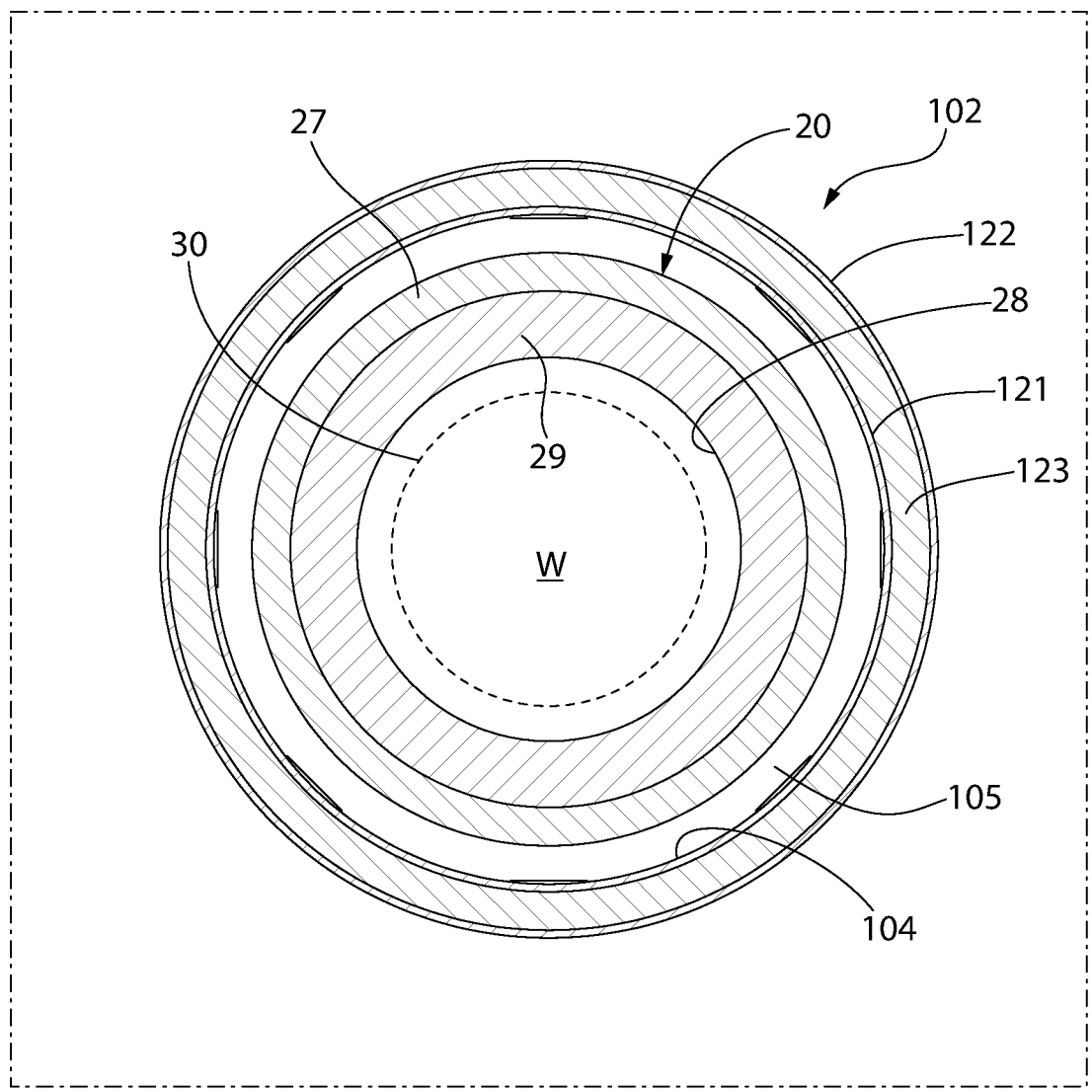
FIG. 12 is a first transverse cross-sectional view taken from FIG. 9 through an upper shielding portion of the containment enclosure.
Figure 13:
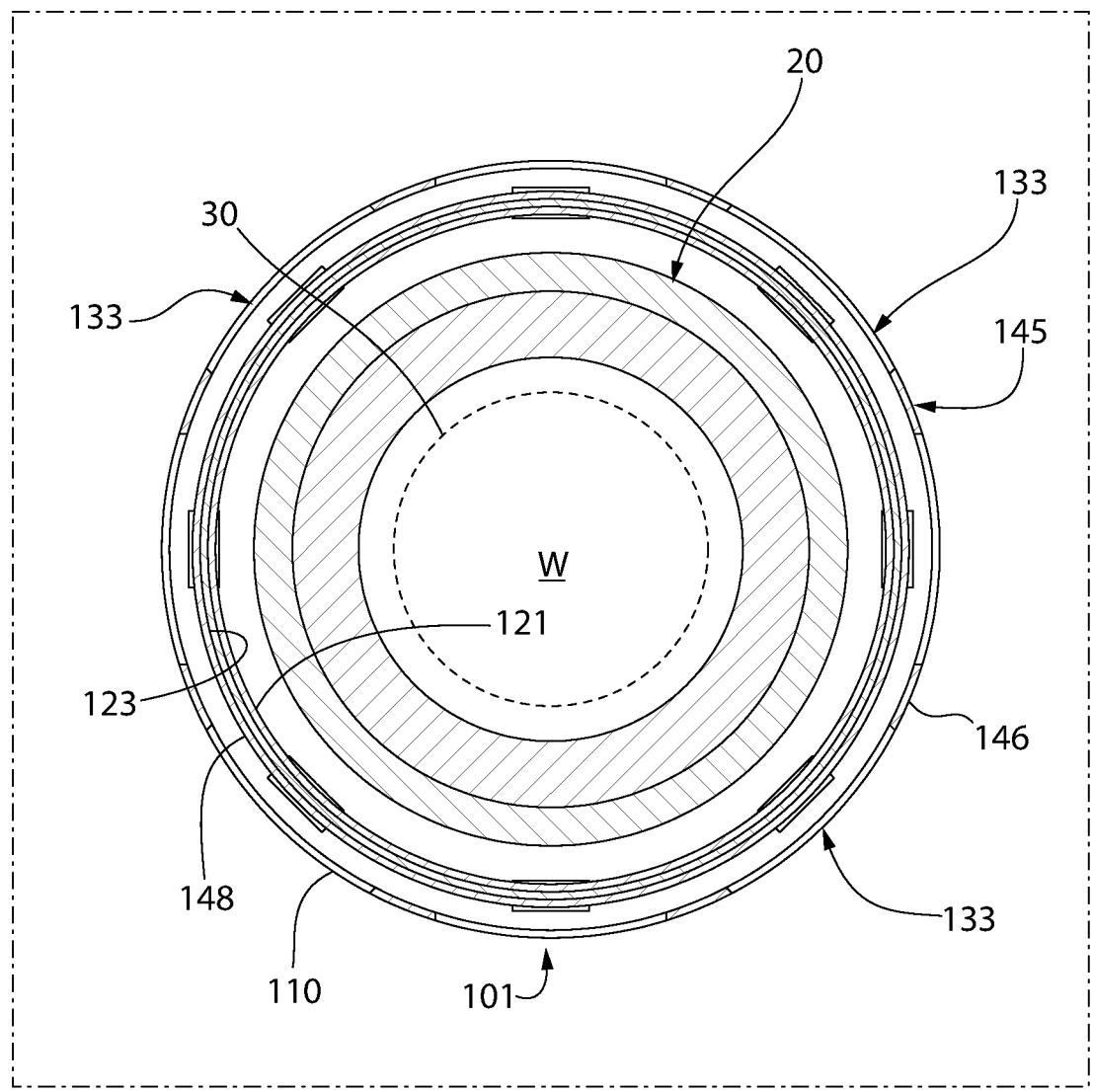
FIG. 13 is a second transverse cross-sectional view taken from FIG. 9 through an air inlet of the upper shielding portion of the containment enclosure.

The upper shielding portion 102 is separated from and sealed to the lower base portion 101 at horizontal circumferential joint 107 by a flat annular gasket 140 compressed between a flat annular upper seal plate 142 of the lower base portion and a flat annular lower seal plate 141 of the shielding portion (best shown in FIGS. 9 and 10). The seal plates and gasket preferably have approximately the same radial width to form a gas-tight seal. The seal plates may be formed of a suitable preferably corrosion resistant metal (e.g. stainless steel) which is welded to each of their respective lower and upper portions 101, 102 at the joint. Any suitable commercially-available gasket material capable of making a gas-tight seal at joint 107 between the seal plates 141, 142 may be used (e.g. neoprene or other). The weight of the upper shielding portion 102 maintains the gasket 140 in the compressed state.

The ambient cooling air ventilation system will now be further described. The cooling air ventilation system essentially includes: (1) an annular downcomer 130 formed in the lower base portion 101; (2) annular riser 132 collectively formed in both the lower base and upper shielding portions 101 between the cask 20 and the base and shielding portions; (3) a plurality of circumferentially spaced upper air inlets 133 formed at the joint 107 between the lower base and shielding portions; (4) upper air inlet plenum 131 in direct fluid communication with the upper air inlets and the downcomer; (5) a plurality of circumferentially spaced internal air exchange passages 134 in lower base portion 101 which are in fluid communication with the bottom of both the downcomer and riser to introduce cooling air into the lower portion of lower cavity 103 of the base portion; (6) top discharge opening 124 formed in the shield jacket 120 of the upper shielding portion; and (7) top discharge openings 125*a* formed in cap 125. These components fluidly cooperate to draw ambient cooling air into the cask containment enclosure 100 via natural gravity driven thermo-siphon effect as air heated by the cask in the containment space 105 of the enclosure creates the cooling air flow circulation or path shown by the dashed air flow lines CA in FIG. 9. The cooling air dissipates the heat emitted by cask 20 from the decaying nuclear waste stored in the canister 30 therein. Details of the foregoing portions of the cooling air ventilation system will be further described below.

Cooling air inlet plenum 131 is formed at the circumference joint 107 between the lower base portion and upper shielding portion 101, 102. The bottom end of radiation-blocking shield jacket 120 may have an inwardly stepped configuration as best shown in FIGS. 9 and 10. This creates an inwardly region at the middle waist portion of cask containment enclosure 100 to define the annular upper air inlet plenum 131 of the cooling air ventilation system. This waist portion and concomitantly the air inlet plenum 131 are located above grade G of the concrete pad 50. In the event of a prevailing or other weather related wind, the inlet plenum advantageously allows the ambient air to circulate around the cask containment enclosure 100 from the higher windward air pressure side to the leeward lower air pressure side to ensure even distribution of ambient air to the downcomer 130.

To in part protect the air inlet plenum 131 from debris and excessive rain infiltration, an annular castellated air inlet skirt 145 is attached to the bottom end of the outer wall 122 of the shield jacket 120. Skirt 145 therefore at least partially encloses the otherwise outwardly open recessed air plenum 131. Outer wall 122 of shield jacket 120 terminates a vertical distance above the top of the lower base portion outer shell 110, and this space is taken up by the skirt 145. Skirt 145 may therefore have the same outer diameter as the outer wall 122 of the jacket 120 to form a flush transition between the jacket and lower base portion 101 as shown. In one embodiment, as best shown in FIG. 10, a flat annular ring plate 147 may be welded to the bottom end of outer wall 122. The top end of skirt 145 is welded to the ring plate.

The bottom end of the skirt 145 defined by the bottom ends of the downwardly-extending castellations 146 may be fielded welded in turn to the top end 149 of the lower base portion outer shell 110 after the upper shielding portion 102 is placed on the lower base portion 101 (see, e.g. FIG. 10). This provides a few advantages. First, this physically and laterally stabilizes the coupling between these two portions to resist laterally acting forces such as those that might be created by a seismic event (e.g. earthquake). By filling in the vertical gap or void at the waist portion of the cask containment enclosure 100 created by the air inlet plenum, skirt 145 therefore creates a vertically continuous structure between outermost wall 122 of shield jacket 120 to outermost shell 110 of lower base portion 101 to transmit a portion of the dead weight of the upper shield jacket to the lower base portion at the peripherally of the cask containment enclosure 100. In addition to the coupling between the lower base portion 101 and upper shielding portion 102 at the inboard gasketed portion of the joint 107, this provides a secondary outboard coupling. This further ensures stability of the inboard gasketed interface between the lower base portion 101 and upper shielding portion 102. The circumferential joint 107 thus may be considered to be both a gasketed at its inboard side and welded at it peripheral outboard side.

In the illustrated embodiment, the plurality of upper air inlets 133 are defined by the open areas formed between the castellations 146 of the air inlet skirt 145; which represents any additional function of the skirt. The air inlets place the air inlet plenum 131 in direct fluid communication with ambient cooling air. The annular cooling air downcomer 130 is in turn in direct fluid communication with the air inlet plenum 131. Air inlets 133 are circumferentially spaced apart preferably around the entire circumference of the cask containment enclosure 100. Any suitable shape air inlets may be used such as polygonal (e.g. rectangular as shown) or non-polygonal. Advantageously, the air inlet skirt 145 is configured to both define the air inlets 133 while the castellations of the skirt serve a structural purpose to distribute a portion of the weight load of the shield jacket 120 to the outer shell 110 of the lower base portion 101. In one embodiment, the annular air inlet skirt 145 may be circular and circumferentially continuous in structure.

An annular ring wall 148 having a greater height than radial thickness closes the inboard portion or side of the air inlet plenum 131. Ring wall 148 may be seal welded to the ring plate 147 at top and to seal plate 141 of the shield jacket 120 at bottom (see, e.g. FIG. 10). Radial gap R3 formed between ring wall 148 and innermost wall 121 of the conjugate shells of the upper shielding portion 101 is filled with the same contiguous radiation shielding material of the intermediate layer 123. This ensures that the inlet air plenum 131 and air inlets 133 protect against straight line radiation streaming from the cask 20 to the ambient environment from the waist area of the cask containment enclosure 100. In the illustrated preferred embodiment, the ring wall 148 and innermost wall 121 of the shield jacket 120 are radially spaced apart by the same radial distance (defined by gap R3) as the radial distance (defined by gap R2) between the pair of conjugate shells 111, 112 of lower base portion 101. This ensures both even distribution of the weight load from the upper shielding portion 102 to the lower base portion 101 and compression of gasket 140.

The internal air exchange passages 134 in one embodiment may be collectively formed by radially aligned through holes in the paired conjugate shells 111, 112 of the lower base portion 101. Preferably, passages 134 are formed in the terminal bottom end of shells 111, 112 to introduce cooling air into the lowest point possible of the cask containment space 105 of the cask containment enclosure 100 at the baseplate 106 of lower base portion 101. Passages 134 are circumferentially spaced apart and may have any suitable polygonal or non-polygonal shape. In the non-limiting illustrated embodiment, passages 134 are downwardly open such that baseplate 106 formed the bottom side of the passages. The air exchange passages allows air descending in to the downcomer 130 to be drawn radially inwards into the cask containment space 105 and enter the bottom end of the cooling air riser 132 for optimum cooling of the cask 20.

The annular cooling air riser 132 is formed in containment space 105 of cask containment enclosure 100 by the radial gap created between cask 20 and the innermost wall or shell of the upper shielding portion 102 and lower base portion 101 as best shown in FIG. 9. Accordingly, the inside diameter of the containment enclosure is preferably larger than the outside diameter of the cask by an amount selected to be the radial width of the annular riser. The riser 132 terminates at top to form a common discharge air plenum 135 between the top of the cask 20 and top end 126 of the shield jacket 120 of upper shielding portion 102. The plenum 135 assumes a frustoconical due to the shape of the frustoconical section 120b of the jacket 120. As noted elsewhere herein, upwardly conversing shape of the discharge air plenum concentrates and increases the velocity of the rising air heated by the cask to effectively drive the thermos-siphon (aka chimney effect) which optimizes cooling of the cask.

In operation, with reference to the cooling air flow lines CA in FIG. 9, air at ambient temperature is drawn radially inwards into and through the upper air inlets 133 and flows radially, into the cooling air inlet plenum 131 from all sides of the cask containment enclosure 100. The air is then drawn vertically downwards into downcomer 130 to the bottom of enclosure 100. The air flows radially inwards through the air exchange passages 134 into containment space 105 and reverses direction flowing vertically upwards in riser 132 along the sides of cask 20 as it is heated by the cask 20. The now heated rising air collects in the discharge plenum 135 above the cask through top discharge opening 124, enters the cap 125, and is discharged radially/laterally outwards therefrom through the plural air discharge outlets 126a back to atmosphere. It bears noting that this naturally driven air cooling system cools the cask which may not be a vented design as shown. The cask, which contains the SNF canister 30 which holds the nuclear waste, emits decay heat which must be dissipated to protect the structural integrity of both the cask and canister.

In the above cooling air ventilation system design, it bears noting that no straight line of sight exists from the containment space 105 inside cask containment enclosure 100 to the outside environment through either air inlets 133 or air discharge outlets 125a in cap 125. Cap 125 is terminated at top with a lid 125b to eliminate a straight line of sight in the vertical direction from the top of cask 20 to atmosphere.

It also is notable that the cooling air ventilation system, and particularly the air inlet plenum 131 and air inlets 133, are only fully formed and completed for operation once the upper shield jacket 120 is placed on the lower base portion 101 embedded in the concrete pad 50.

A method or process for providing radiation shielding for a cask 20 containing a nuclear waste canister 30 using cask containment enclosure 100 will now be briefly summarized. General reference is made to FIGS. 1-14 in the description which follows, with reference to specific figures noted as needed.

The method begins with the step of first embedding the lower base portion 101 of cask containment enclosure 100 in the concrete pad 50. This step in some implementations may include sub-steps including a two pour process for forming the concrete pad. This includes first pouring/forming a flat-topped lower foundation section 50a of the concrete pad (reference FIG. 7). This provides temporary support for the lower base portion 101. Next, the lower base portion 101 is then positioned on top of the poured foundation section. The baseplate 106 of lower base portion 101 rests directly on the foundation section as shown. Next, a second pour is made creating an upper section 50b of concrete pad 50 which embeds the lower base portion 101 of cask containment enclosure 100. The upper section 50b is poured to a depth such that the final grade G of the concrete pad 50 remains below the cooling air inlets 133, thereby keeping the inlets exposed. It bears noting that due to its embedment, the lower base portion 101 preferably has no lateral openings to preclude the unhardened concrete from entering the base portion. The exposed part of the outer shell 110 of the lower base portion 101 preferably has a sufficient height selected to prevent runoff from entering the air inlets 133.

The main method or process continues by lowering and positioning the cask 20 containing canister 30 with nuclear waste W therein into the upwardly open lower cavity 103 of the lower base portion 101. The annular gasket 140 may be placed on annular seal plate 142 of the lower base portion 101 before or after positioning the cask in the lower base portion.

The process then continues by positioning the upper shielding portion 102 (i.e. shield jacket 120) over the cask and on top of the embedded lower base portion 101 of cask containment enclosure 100. During the process, the gasket 140 at circumferential joint 107 is compressed between the lower base portion and upper shielding portion (i.e. between seal plate 142 of lower base portion and seal plate 141 of the upper shielding portion). The castellations 146 of the air inlet skirt 145, which preferably is already shop welded onto the shield jacket 120, are concurrently abuttingly engaged with the outer shell 110 of the lower base portion 101. The castellations may then be welded to the shell 110. It bears noting that lifting lugs 150 (represented schematically in FIG. 5) of any suitable configuration may be welded to the lower base portion 101 and upper shielding portion 102 to facilitate lifting these parts of the cask containment enclosure 100 with a cask transport crawler, crane, or other suitable lifting equipment.

The foregoing simple process effectively shields the cask 20. The natural convective air cooling ventilation system is automatically activated by the heat emitted from the cask once enclosed in the now fully assembled cask containment enclosure 100.

FIG. 15 shows an example of a full ISFSI (independent spent fuel storage installation) comprising an array of cask containment enclosures 100 according to the present disclosure. The vacant aisles formed between rows of the enclosures need only be width enough to allow the tracks or wheels of the cask crawler to straddle each enclosure for first loading the cask into the previously embedded lower base portions 101, and placing the upper shielding portions 102 thereon. This allows the cask containment enclosures to be tightly packed in an array on the concrete pad 50. The pad may be formed as a single large concrete structure formed at one time, or in multiple sections formed over time as additional cask storage space is needed.

Numerous advantages can be attributed to the two-piece cask containment enclosure 100. For example, the two-part system which is field assembled makes it easier to handle and transport each of the lower base portion 101 and upper shielding portion 102 individually rather than as a larger single shop-fabricated enclosure cask storage enclosure with a circular top closure lid. In another aspect, multiple lower base portions 101 formed of the cylindrical coaxial metal shells previously described herein can be pre-installed and embedded in the concrete pad 50 well in advance of storing any SNF or other high level radiation waste at the ISFSI. The ISFSI is therefore prepared to accept casks 20 containing the nuclear waste at any point in time thereafter when needed in accordance with the method previously described herein. Pre-installed lower base portions 101 may be temporarily capped to prevent ingress of rainwater until the cask storage space is needed. In addition, since the lower base portion 101 receives the benefit of radiation shielding provided by the concrete pad 50, no additional radiation shielding materials are required for this lower unit which reduces the overall cost of the cask storage enclosure.

While the foregoing description and drawings represent some example systems, it will be understood that various additions, modifications and substitutions may be made therein without departing from the spirit and scope and range of equivalents of the accompanying claims. In particular, it will be clear to those skilled in the art that the present invention may be embodied in other forms, structures, arrangements, proportions, sizes, and with other elements, materials, and components, without departing from the spirit or essential characteristics thereof. In addition, numerous variations in the methods/processes described herein may be made. One skilled in the art will further appreciate that the invention may be used with many modifications of structure, arrangement, proportions, sizes, materials, and components and otherwise, used in the practice of the invention, which are particularly adapted to specific environments and operative requirements without departing from the principles of the present invention. The presently disclosed embodiments are therefore to be considered in all respects as illustrative and not restrictive, the scope of the invention being defined by the appended claims and equivalents thereof, and not limited to the foregoing description or embodiments. Rather, the appended claims should be construed broadly, to include other variants and embodiments of the invention, which may be made by those skilled in the art without departing from the scope and range of equivalents of the invention.

What is claimed is:

1. A containment enclosure for shielding a nuclear waste cask comprising:
    a lower base portion at least partially embedded in a concrete pad, the base portion comprising a baseplate supporting a plurality of coaxially aligned shells defining a lower cavity;
    an upper radiation shielding portion coupled to and supported by the lower base portion, the shielding portion defining an upper cavity;
    the shielding portion comprising a radiation shielding material configured to block gamma and neutron radiation;
    the lower and upper cavities collectively defining a contiguous containment space configured for holding the cask;
    wherein the base and shielding portions enclose the cask.

2. The system according to claim 1, wherein the radiation shielding material comprises boron.

3. The system according to claim 2, wherein the shielding portion has a composite wall construction comprising an outer wall, an inner wall, and an intermediate layer sandwiched therebetween which comprises the boron.

4. The system according to claim 3, wherein the outer and inner walls are formed of steel.

5. The system according to claim 3, wherein the shielding portion comprises a straight cylindrical sidewall section and a frustoconical top wall section terminating in a top opening.

6. The system according to claim 1, wherein the shielding portion is separated from and sealed to the lower base portion at a horizontal joint by an annular gasket compressed between an annular upper seal plate of the lower base portion and an annular lower seal plate of the shielding portion.

7. The system according to claim 6, wherein the annular gasket is spaced radially inwards from an exterior surface of the cask containment enclosure.

8. The system according to claim 1, further comprising an ambient cooling air ventilation system comprising an annular downcomer formed in the lower base portion, and an annular riser collectively formed in the lower base and shielding portions between the cask and the base and shielding portions.

9. The system according to claim 8, wherein the ventilation system further comprises:
    a plurality of upper air inlets circumferentially spaced apart at a circumferential joint between the base portion and the shielding portion;
    an annular upper air inlet plenum in fluid communication with the upper air inlets and the downcomer;
    a plurality of air exchange passageways circumferentially spaced apart at a bottom of the base portion, the passageways in fluid communication with the downcomer and riser; and
    a top discharge opening formed in the shielding portion in fluid communication with the riser.

10. The system according to claim 9, wherein the ventilation system defines a natural convection-driven ventilation air pathway in which air enters the upper air inlets in a laterally inward direction, flows downwards in the downcomer to the air exchange passageways, reverses direction and flows upwards in the riser to the top discharge opening.

11. The system according to claim 9, wherein a bottom end of the shielding portion has a castellated configuration which defines the upper air inlets.

12. The system according to claim 11, further comprising a castellated annular air inlet skirt welded to a bottom end of shielding portion which comprises a plurality of circumferentially spaced castellations.

13. The system according to claim 12, wherein bottom ends of the castellations are welded to a top end of the base portion.

14. The system according to claim 9, wherein the annular upper air inlet plenum is located at the circumferential joint and recessed inside the shielding portion.

15. The system according to claim 14, wherein the circumferential joint comprises an annular gasket located inboard of the annular air inlet plenum.

16. The system according to claim 9, further comprising a frustoconical shaped discharge plenum located in the upper shielding portion above the cask.

17. The system according to claim 9, wherein no straight line of sight exists through the upper air inlets to outside to prevent straight line radiation streaming.

18. The system according to claim 1, wherein the containment space is configured for holding no more than a single one of the cask.

19. The system according to claim 1, wherein the cask contains a spent nuclear fuel canister therein which contains the nuclear waste.

20. The system according to claim 3, wherein the shells of the base portion comprises an outer shell, and a pair of conjugate shells spaced radially inwards therefrom by a distance greater than a radial gap formed between the conjugate shells.

21. The system according to claim 20, wherein a bottom end of the shielding portion comprises an inwardly recessed stepped portion including a pair of conjugate walls spaced radially apart by a radial gap the same as the radial gap between the conjugate shells of the base portion.

22. The system according to claim 21, further comprising a first annular seal plate attached to the conjugate walls and a second annular seal plate attached to the conjugate shells, and an annular gasket compressed between the first and second annular seal plates.

23. A nuclear waste storage facility comprising a plurality of the containment enclosures according to claim 1.

24. A nuclear waste storage system comprising:
a concrete pad;
a plurality of cask containment enclosures arranged on the concrete pad, each containment enclosure housing a storage cask containing a canister holding radioactive nuclear waste;
each containment enclosure comprising:
a cylindrical lower base portion at least partially embedded in the concrete pad, the lower base portion comprising a baseplate supporting a plurality of coaxially aligned shells defining a lower cavity;
a separate upper shield jacket coupled to and supported by the lower base portion, the shield jacket having a wall construction comprising boron-containing radiation shielding materials, the upper shield jacket defining an upper cavity;
a plurality of ambient cooling air inlets formed in the shield jacket, the air inlets circumferentially spaced apart at a circumferential joint between the base portion and the shield jacket;
an annular air inlet plenum formed at a bottom of the shield jacket by an inwardly recessed stepped portion of the shield jacket, air inlet plenum located at the circumferential joint and in direct fluid communication with the air inlets and a downcomer formed in the lower base portion;
a plurality of air exchange passageways circumferentially spaced apart at a bottom of the base portion, the passageways in fluid communication with the downcomer and a riser which extends vertically between the cask and innermost surfaces of the lower base portion and shield jacket; and
a top discharge opening formed in the shield jacket in fluid communication with the riser and ambient air;
wherein the storage cask containing nuclear waste is positioned partially in both the upper and lower cavities of the lower base portion and shield jacket.

25. The system according to claim 24, further comprising a cap attached to a top of the shield jacket, the cap defining a plurality of laterally open air discharge openings for venting air heated in the riser by the cask to atmosphere.

26. The system according to claim 24, wherein the cooling air inlets are formed by an annular castellated skirt attached to a bottom end of the shield jacket.

27. The system according to claim 24, wherein the circumferential joint is located radially inboard of the cooling air inlets, the circumferential joint including an annular gasket compressed between the lower base portion and the shield jacket.

28. The system according to claim 24, wherein the upper and lower cavities are collectively configured to hold no more than a single storage cask.

29. The system according to claim 24, wherein ambient cooling air flow is driven by natural convection circulation, the cooling air flowing through the cooling air inlets into the inlet plenum, downward through the downcomer, inwards through the air exchange passageways into a bottom of the riser, and upwards through the riser to the discharge opening in the shield jacket.

30. The system according to claim 24, wherein the shield jacket comprises an upper frustoconical section, a lower cylindrical section, and an annular air inlet skirt attached to the lower cylindrical section which defines openings for the cooling air inlets.

* * * * *